United States Patent [19]

Fukushima

[11] Patent Number: 5,380,256
[45] Date of Patent: Jan. 10, 1995

[54] TOROIDAL TYPE CONTINUOUSLY VARIABLE TRANSMISSION

[75] Inventor: Hiroshi Fukushima, Ayase, Japan
[73] Assignee: NSK Ltd., Tokyo, Japan
[21] Appl. No.: 90,575
[22] Filed: Jul. 12, 1993
[30] Foreign Application Priority Data Jul. 27, 1992 [JP] Japan ............... 4-57865[U]

[51] Int. Cl.⁶ ............................................. F16H 15/38
[52] U.S. Cl. ............................................ 476/40; 476/46
[58] Field of Search ................. 476/40, 41, 42, 46

[56] References Cited

U.S. PATENT DOCUMENTS 2,910,878 11/1959 Erban ................................. 476/40
4,928,542 5/1990 Nakano .

FOREIGN PATENT DOCUMENTS 62-71465 5/1987 Japan .
4-96654 8/1992 Japan .
4-307152 10/1992 Japan ................................ 476/40

Primary Examiner—Allan D. Herrmann
Attorney, Agent, or Firm—Shapiro and Shapiro

[57] ABSTRACT

For achieving a reduced manufacturing cost and a light weight, a toroidal type continuously variable transmission is provided with a trunnion having a base formed of an appropriately machined cylindrical member, and a pair of pivots protruding from both end surfaces of the base, wherein a second center axis of the pivots is offset from a first center axis of the base toward the position at which a power roller is arranged.

2 Claims, 7 Drawing Sheets

TOROIDAL TYPE CONTINUOUSLY VARIABLE TRANSMISSION

BACKGROUND OF THE INVENTION

1. Field of the Invention

The present invention relates to a toroidal type continuously variable transmission for use in, for example, a transmission for automobiles.

2. Related Background Art

An investigation has been made on utilization of a toroidal type continuously variable transmission, schematically shown in FIGS. 4 and 5, as a transmission for automobiles. Such a transmission to which the present invention is applicable is schematically shown in FIGS. 4 and 5. This toroidal type continuously variable transmission has an input side disk 2 supported concentrically with an input shaft 1 and an output side disk 4 fixedly attached to an end of an output shaft 3, as disclosed in Japanese Utility Model Application Laid-Open No. 62-71465. The inner surface of a casing which accommodates the toroidal type continuously variable transmission or a supporting bracket arranged in this casing is provided with trunnions 6 which swing about pivots 5 located at twisted positions with respect to the input shaft 1 and the output shaft 3, respectively.

Each of the trunnions 6 is made of a metal material having a sufficient rigidity and provided with the pivots 5 mounted on the outer surfaces of both ends, as shown in FIGS. 6 to 8. A circular hole 7 formed through a central portion of each trunnion 6 supports a base end of a displacement shaft 8 (see FIGS. 4 and 5) in a manner that an inclination angle of the displacement shaft 8 is adjustable by swinging the trunnion 6 about the pivot 5.

Around the displacement shafts 8 supported by the respective trunnions 6, power rollers 9 are rotatably supported. Each of the power rollers 9 is sandwiched between the input side and output side disks 2 and 4.

The inner surface 2a, 4a of the input side and output side disks 2, 4, opposite to each other, respectively have a cross-section which forms an arcuate concave surface, the center of which is located on the pivot 5. The outer peripheral surfaces 9a of the respective power rollers 9 formed in a spherical convex shape abut the inner surfaces 2a, 4a of the disks 2, 4, respectively.

A pressurizing unit 10 of a loading cam type is arranged between the input shaft 1 and input side disk 2 for resiliently pressurizing the input side disk 2 toward the output side disk 4. This pressurizing unit 10 is formed by a cam plate 11 which rotates together with the input shaft 1, and a plurality of (for example, four) rollers 13 retained by a retainer 12. On one side (the right side shown in FIGS. 4 and 5) of the cam plate 11, there is formed a cam surface 14 which presents an uneven surface in the circumferential direction. The outside (the left side, shown in FIGS. 4 and 5) of the input side disk 2 is also formed with a similar cam surface 15. Then, the plurality of rollers 13 are arranged for rotation about an axis in the radial direction relative to the center of the input shaft 1.

In operation of the toroidal type continuously variable transmission constructed as described above, when the cam plate 11 is rotated by the rotation of the input shaft 1, the plurality of rollers 13 are urged to the cam surface 15 on the outer surface of the input side disk 2 by the cam surface 14. As a result, the input side disk 2 is urged by the plurality of power rollers 9, and simultaneously with this, the pair of cam surfaces 14, 15 engage with the plurality of rollers 13, causing the input side disk 2 to rotate. Then, the rotation of the input side disk 2 is transmitted to the output side disk 4 through the plurality of power rollers 9, resulting in rotating the output shaft 3 fixedly attached to this output side disk 4.

Consider now that the rotational speed of the input shaft 1 and the output shaft 3 is changed. First, when the speed of the input shaft 1 and the output shaft 3 is decreased, the respective trunnions 6 are swung about the pivots 5 as shown in FIG. 4 to incline the respective displacement shafts 8 such that the outer peripheral surfaces 9a of the respective power rollers 9 abut a portion near the center of the inner surface 2a of the input side disk 2 and a portion near the outer periphery of the inner surface 4a of the output side disk 4, respectively.

Conversely, when the speed is increased, the trunnions 6 are swung as shown in FIG. 5 to incline the respective displacement shafts 8 such that the outer peripheral surfaces 9a of the respective power rollers 9 abut a portion near the outer periphery of the inner surface 2a of the input side disk 2 and a portion near the center of the input side surface 4a of the output side disk 4, respectively. If the inclination angle of the displacement shafts 8 is adjusted to be an intermediate value between those shown in FIGS. 4 and 5, an intermediate transmission gear ratio can be achieved between the input shaft 1 and the output shaft 3.

FIG. 9 shows a mechanism for inclining the trunnions 6 about the respective pivots 5 during a transmission operation, which is described in the specification of U.S. Pat. No. 4,928,542. Specifically, the pivots 5 are supported by needle bearings 16 so as to permit the pivots 5 to rotate and slightly displace in the axial direction with respect to a housing 17. For a transmission operation, pressure oil is supplied to a hydraulic cylinder 18 supported by the housing 17 to displace the trunnions 6 in the axial direction. Based on this displacement, the relationship of contact positions between the outer peripheral surfaces 9a of the power rollers 9 and the inner surfaces 2a, 4a (FIGS. 4 and 5) of the input side and output side disks 2, 4 is changed, causing the trunnions to swing about the respective pivots 5 in any direction.

Incidentally, a demand exists for reduction in weight and improvement in performance of the toroidal type continuously variable transmission constructed and operated as described above which may be incorporated in an actual transmission or the like.

On the other hand, the trunnions 6 for pivotally supporting the respective power rollers 9 are so heavy that the utilization of the trunnions 6 has constituted a restriction for reducing the weight of the toroidal type continuously variable transmission.

Specifically the trunnion 6 incorporated in a conventional toroidal type continuously variable transmission has a base 23 for supporting a base end of the displacement shaft 8 coupled to an intermediate portion of one side thereof and a pair of pivots 5 protruding from both end surfaces of the base 23. The base 23 is made from a cylindrical member of a material having a sufficient rigidity such as steel, and is formed with a recess 24 by machining an intermediate portion of one surface of the cylindrical member. In a circular hole 7 formed through the base 23 in a central portion of the recess 24, the base end of the displacement shaft 8 is inserted such that the displacement shaft 8 is freely coupled to and supported by the trunnion 6. The pivots 5 are arranged on both end surface of the base 23 coaxially with the base 23.

In the conventional trunnion 6 constructed as described above, since the center of the base 23 is coincident with the center of the pivots 5, useless portions may be included in a design for ensuring a withstandable load of the trunnion 6. In other words, the trunnion 6 tends to be heavier than is required.

For example, when the pivot 5 is applied with a force in the direction perpendicular to the central axis, this force is supported by plate members 25 which couple the base 23 to the pivots 5. However, peripheral portions of these plate members 25 indicated by a lattice pattern in FIG. 6 are almost useless for supporting these force and merely cause the total weight to be heavier.

When the displacement shaft 8 is applied with a force in the direction perpendicular to the central axis thereof through the power rollers 9, an inserted portion of the base end of the displacement shaft 8 with the circular hole 7 supports this force. For this purpose, it should be ensured that a sufficient thickness T, be provided to a body member 26 which is part of the base 23 and through which the circular hole is formed. However, when the center axis of the base 23 is coincident with the center axis of the pivots 5, the cross-section of the body member 26 becomes larger than is required. For this reason, not only the weight of the plate members 25 but also the weight of the body member 26 are so excessive that the trunnion 6 as a whole is too heavy.

Although it is of course possible to reduce the weight of the trunnion 6 by removing portions useless for improving the withstandable load, a process of selectively removing unnecessary portions is rather difficult and causes a higher manufacturing cost of the trunnion, so that it is not preferable.

SUMMARY OF THE INVENTION

It is an object of the present invention to provide a toroidal type continuously variable transmission which realizes reduction in weight and manufacturing cost.

The toroidal type continuously variable transmission according to the present invention comprises, similarly to the conventional toroidal type continuously variable transmission described above, an input side disk; an output side disk arranged coaxially with the input side disk and supported for rotation relative to the input side disk; a trunnion for swinging about a pair of pivots located at twisted positions with respect to the center axis of the input side and output side disks; a displacement shaft supported by the trunnion; and a power roller rotatably supported by the displacement shaft and sandwiched between the input side and output side disks, wherein the inner surfaces of the input side and output side disks, opposite to each other, are each formed in a concave shape, the cross-section of which is arcuate, and the peripheral surface of the power roller is formed in a spherical convex shape such that the peripheral surface of the power roller abuts the inner surfaces of both the disks.

Further, in the toroidal type continuously variable transmission of the present invention, the trunnion comprises a base for supporting a base end of the displacement shaft coupled to an intermediate portion of one side thereof; and a pair of pivots protruding from both end surfaces of the base.

The base is made of a cylindrical member having a first center axis which is formed with a recess in an intermediate portion of one surface of the cylindrical member such that the end base of the displacement shaft is freely coupled and supported in an intermediate portion of the recess. Each of the pair of pivots is parallel to the first center axis and formed in the shape of a cylinder having a second central axis which is offset from the first center axis toward the protruding direction of the displacement shaft.

The operation of the toroidal type continuously variable transmission of the present invention for arbitrarily changing the transmission ratio between the input shaft and the output shaft is similar to the operation of the conventional toroidal type continuously variable transmission.

The toroidal type continuously variable transmission of the present invention allows the trunnion to be reduced in weight while maintaining the rigidity of the same. Further, it is not necessary to subject the trunnion to difficult machining. For this reason, a light-weight toroidal type continuously variable transmission can be provided at a low cost.

DETAILED DESCRIPTION OF THE PREFERRED EMBODIMENTS

Figure 1:
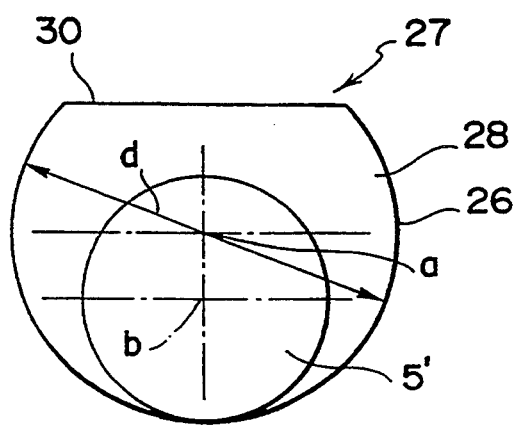
FIG. 1 ms an end view of a trunnion according to an embodiment of the present invention.
Figure 2:
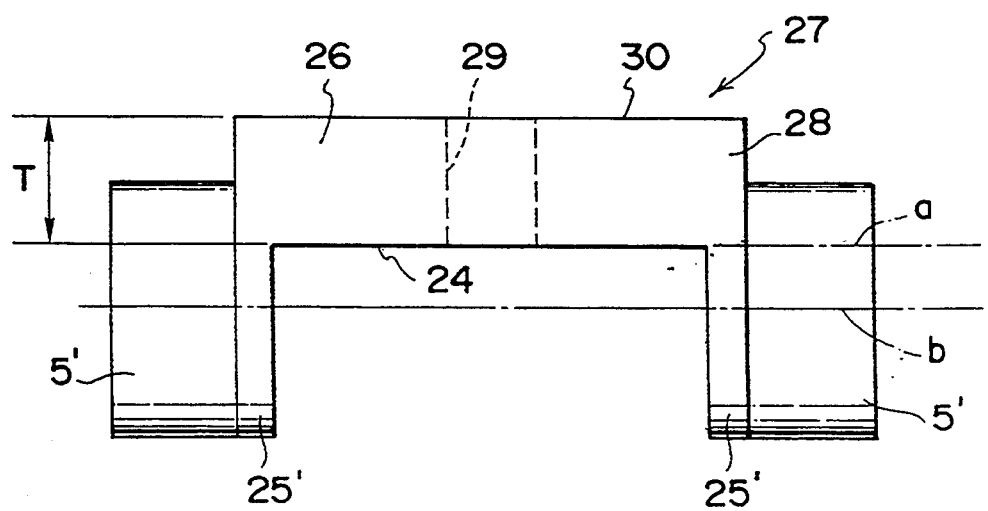
FIG. 2 is a side view of the trunnion shown in FIG. 1.
Figure 3:
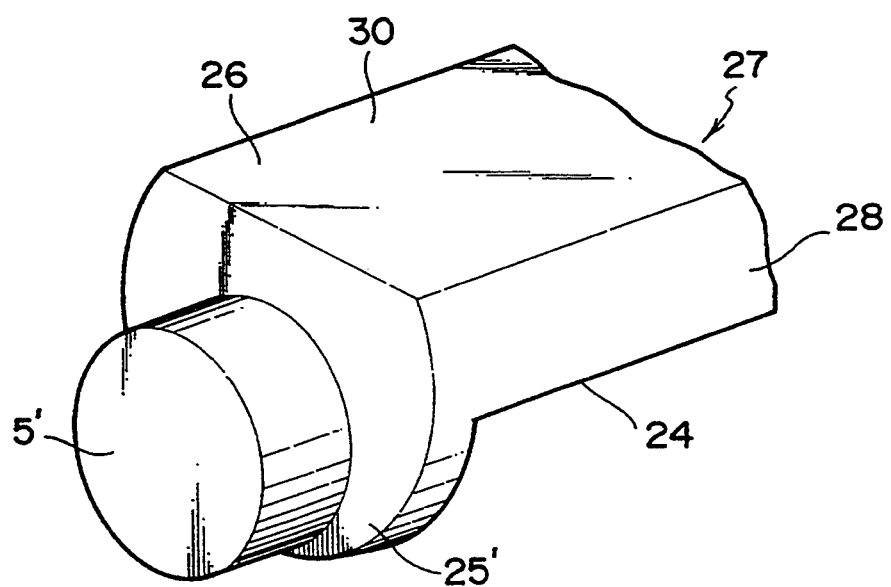
FIG. 3 is a perspective view showing part of the trunnion stun in FIG. 1.

FIGS. 1 to 3 show an embodiment of the present invention. It should be first noted that a toroidal type continuously variable transmission of the present invention features the shape of a trunnion, and the rest of the parts are similar to those in the above described conventional structure, so that the following explanation will be centered on the trunnion.

The trunnion 27, made of a material having a sufficient rigidity such as steel, has a base 28 and a pair of pivots 5' protruding from both end surfaces of the base 28. The base 28 is formed by partially machining a cylindrical member having a first center axis a. More specifically, a recess 24 is formed by machining an intermediate portion of one surface of the material, and a circular hole 29 is formed through a central portion of the recess 24. A base end of a displacement shaft for supporting a power roller is inserted into the circular hole 29 and fixed thereto. Also, both ends of the base 28 extend along the recess 24 to form plate members 25' which are perpendicular to a body member 26 formed with the circular hole 29. Further, in the illustrated embodiment, the surface of the base opposite the recess 24 is milled to form a flat surface 30 parallel to the recess 24.

On the outer surface of each of plate members 25', there is provided a pivot 5' protruding therefrom. The respective pivots 5', formed integrally with the base 28, are each parallel to the first center axis a and formed in the shape of a cylinder which has a second center axis b offset from the first center axis a toward the protruding direction of the displacement shaft 8 (in the downward direction in FIGS. 1 to 3).

Figure 4:
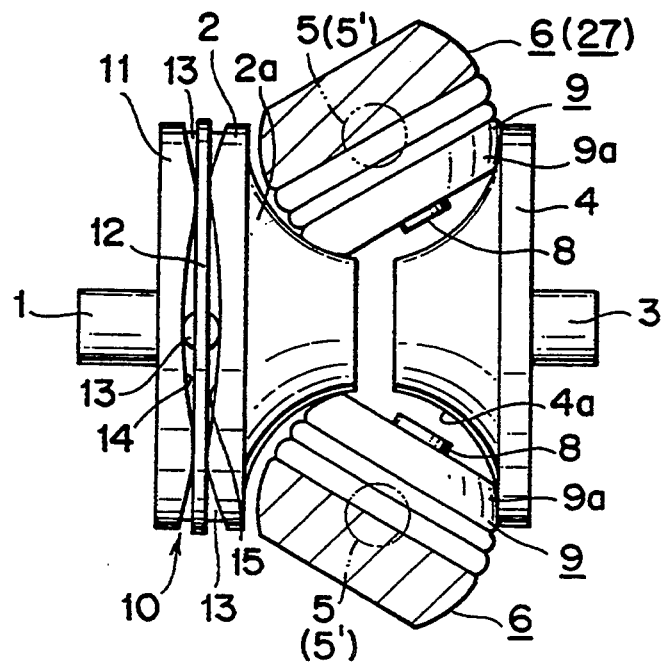
FIG. 4 is a side view showing the basic structure of a toroidal type continuously variable transmission, to which the present invention applies, in its maximally decelerated state.
Figure 5:
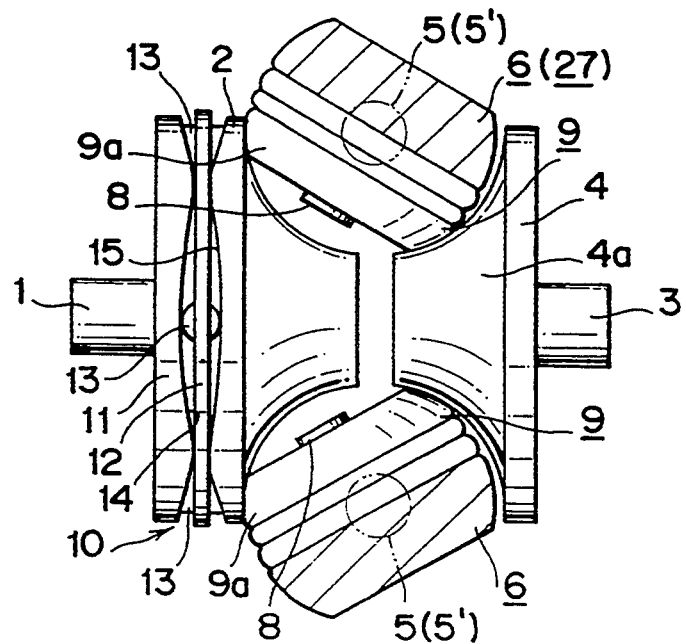
FIG. 5 is a side view of the basic structure shown in FIG. 4 its maximally accelerated state.

The action of the toroidal type continuously variable transmission incorporating the trunnion 27 constructed as described above for freely changing the transmission gear ratio between the input shaft 1 and the output shaft 3 (see FIGS. 4 and 5) is similar to that of the earlier described conventional toroidal type continuously variable transmission as described.

With the toroidal type continuously variable transmission of the present invention, the trunnion 27 can be reduced in weight while the rigidity thereof is ensured. More specifically, each of the plate members 25' having the pivot 5' protruding from the outer surface thereof becomes gradually thinner toward the end thereof at which the pivot 5' is mounted, so that substantially no useless portion exists from the viewpoint of ensuring a sufficient rigidity.

It should be noted that the thickness T of the body member 26 can be sufficiently ensured even if the diameter d of the base 28 is shorter than the diameter D of the base 23 (see FIG. 6) in the conventional structure described above. Therefore, a reduction in the cross-section of the body member 26 will result in decreasing the weights of the body member 26 as well as the plate members 25'.

Figure 6:
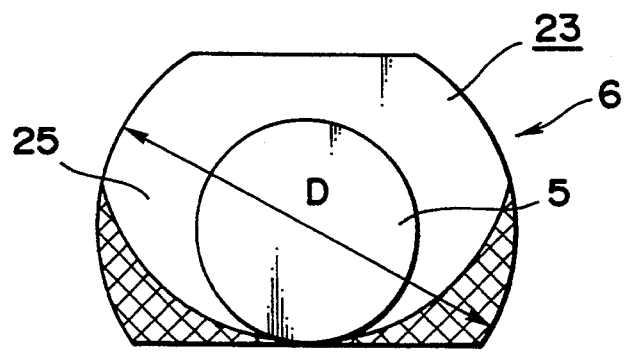
FIG. 6 is an end view of a conventionally utilized trunnion
Figure 7:
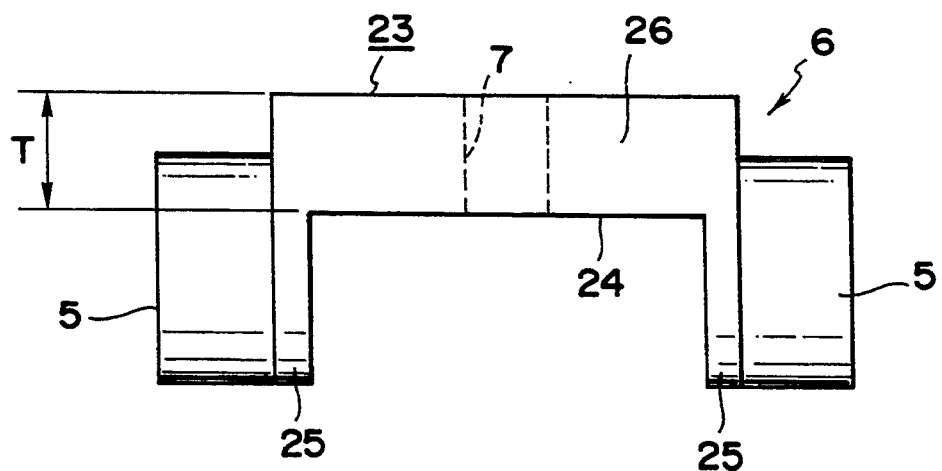
FIG. 7 is a side view of the trunnion shown in FIG. 6.
Figure 8:
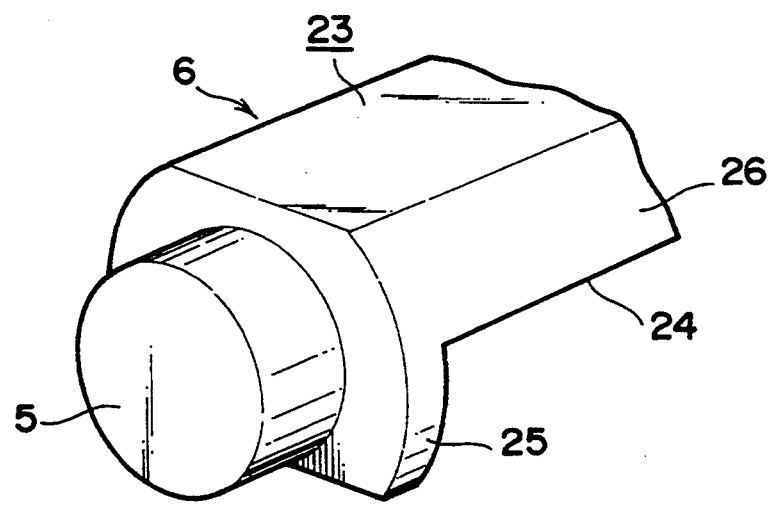
FIG. 8 is a perspective view showing part of the trunnion shown in FIG. 6.
Figure 9:
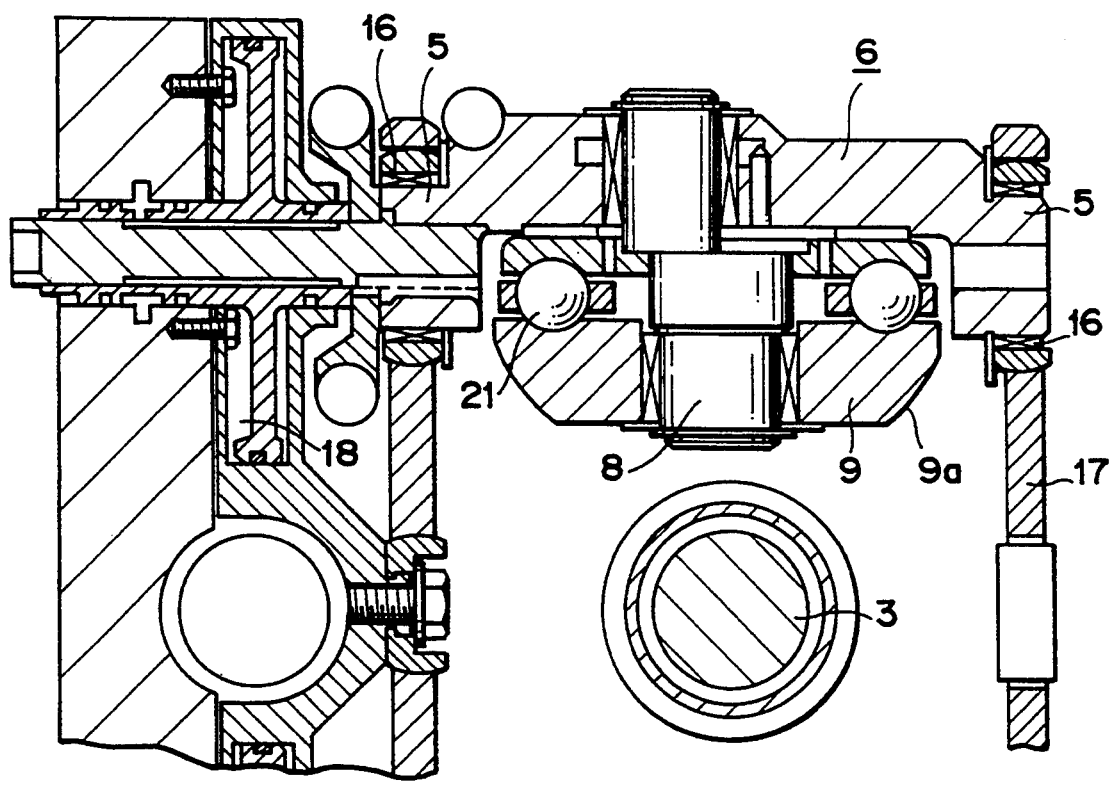
FIG. 9 is a cross-sectional view showing another example conventional structure.

Further, no difficult machining is necessary for forming the base 23 and the pivots 5', as compared with the conventional structure shown in FIGS. 6 to 8, whereby a light-weight toroidal type continuously variable transmission can be provided at a low cost.

Figure 10:
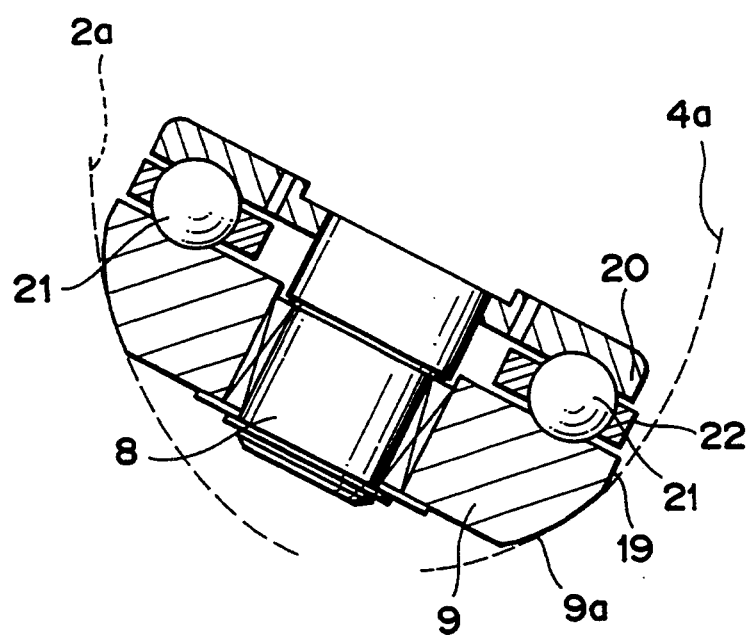
FIG. 10 is a cross-sectional view showing a power roller according to another embodiment of the present invention.

In the toroidal type continuously variable transmission of the present invention constructed and operated as described above, the trunnion can be reduced in weight while a sufficient strength is maintained, thereby making it possible to achieve reduction in weight and improvement in performance of the toroidal type continuously variable transmission Incidentally, referring to FIG. 10, a cylindrical surface portion 19 is formed in a maximal diameter portion on the outer peripheral surface of the power roller 9. Also, the outer peripheral edge of an outer ring 20 for pivotally supporting the power roller 9 with respect to the displacement shaft 8, as well as the outer peripheral edge of a retainer 22 for retaining balls 21 are located inwardly from the virtual spherical surface extending from the outer peripheral surface 9a of the power roller 9, so that the respective outer peripheral edges are prevented from contacting the inner surfaces 2a, 4a of the input side and output side disks 2, 4 even if the maximum acceleration and deceleration positions of the power roller are exceeded.

What is claimed is:

1. A toroidal type continuously variable transmission, comprising:

an input side disk and an output side disk arranged coaxially with said input side disk and supported for rotation relative to said input side disk, said input side disk and said output side disk having opposed concave inner surfaces of arcuate cross section;

a power roller sandwiched between said inner surfaces of said input side disk and said output side disk and having a spherical convex peripheral surface abutting said inner surfaces;

a displacement shaft on which said power roller is rotatably supported; and a trunion supporting said displacement shaft and including a cylindrical base having a recessed intermediate portion to which a base end of said displacement shaft is mounted and a pair of cylindrical pivots protruding from opposite ends of said base and on which said trunion is swingable, said pivots each having a central pivot axis parallel to a central axis of said base and offset from said central axis of said base in a protruding direction of said displacement shaft.

2. A toroidal type continuously variable transmission according to claim 1, further comprising:

a cylindrical surface portion formed in a maximum diameter portion on the outer peripheral surface of said power roller;

an outer ring for supporting said power roller for rotation relative to said displacement shaft;

rolling means arranged between said outer ring and said power roller; and a retainer for retaining said rolling means, wherein an outer peripheral edge of said outer ring and an outer peripheral edge of said retainer are positioned inwardly from a virtual spherical surface formed by circumferentially extending the outer peripheral surface of said power roller.

* * * * *